United States Patent
Chang et al.

(10) Patent No.: US 12,489,470 B2
(45) Date of Patent: Dec. 2, 2025

(54) WIRELESS ACCESS POINT APPARATUS AND CHANNEL SWITCHING METHOD THEREOF

(71) Applicant: Realtek Semiconductor Corporation, Hsinchu (TW)

(72) Inventors: Chung-Yao Chang, Hsinchu (TW); Chuan-Hu Lin, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 279 days.

(21) Appl. No.: 18/516,930

(22) Filed: Nov. 21, 2023

(65) Prior Publication Data
US 2024/0187021 A1  Jun. 6, 2024

(30) Foreign Application Priority Data
Dec. 1, 2022  (TW) .................. 111146212

(51) Int. Cl.
*H04B 1/00* (2006.01)
*H03M 1/06* (2006.01)
*H03M 1/12* (2006.01)

(52) U.S. Cl.
CPC .......... *H04B 1/005* (2013.01); *H03M 1/0626* (2013.01); *H03M 1/12* (2013.01)

(58) Field of Classification Search
CPC .................. H04B 1/005; H04B 1/12
See application file for complete search history.

(56) References Cited

U.S. PATENT DOCUMENTS

| | | | |
|---|---|---|---|
| 9,635,649 B1* | 4/2017 | Amiri | H04W 72/20 |
| 2005/0059364 A1 | 3/2005 | Hansen et al. | |
| 2021/0409961 A1* | 12/2021 | Changlani | H04W 48/16 |

FOREIGN PATENT DOCUMENTS

CN  103959679 A  7/2014

* cited by examiner

*Primary Examiner* — Justin Y Lee
(74) *Attorney, Agent, or Firm* — CKC & Partners Co., LLC

(57) ABSTRACT

A wireless access point apparatus includes a mixer, an analog low-pass filter (ALPF), an analog-to-digital converter (ADC), a radar detector and a controller. The mixer is configured to mix a wireless signal and a carrier signal for performing frequency conversion on the wireless signal. The ALPF with a passband is configured to perform filtering on the wireless signal, so as to filter out a signal component of the wireless signal out of the passband. The ADC is configured to convert the wireless signal from an analog form to a digital form. The radar detector is configured to detector whether the wireless signal includes any radar signal. The controller is configured to adjust a carrier frequency of the carrier signal depending on a determination result of the radar detector for switching between a dynamic frequency selection (DFS) channel, a non-DFS channel and a composite channel.

20 Claims, 15 Drawing Sheets

| Frequency Range (MHz) | 5150-5250 | 5250-5350 | 5470-5725 | 5725-5850 | 5850-5925 |
|---|---|---|---|---|---|
| Band Name | U-NII-1 | U-NII-2A | U-NII-2C | U-NII-3 | U-NII-4 |
| DFS Channel ? | No | Yes | Yes | No | No |
| Center Frequency (MHz) | 5180, 5200, 5220, 5240 | 5260, 5280, 5300, 5320 | 5500, 5520, 5540, 5560, 5580, 5600, 5620, 5640, 5660, 5680, 5700, 5720 | 5745, 5765, 5785, 5805, 5825 | 5845, 5865, 5885, 5905 |
| 20MHz Channel No. | 36, 40, 44, 48 | 52, 56, 60, 64 | 100, 104, 108, 112, 116, 120, 124, 128, 132, 136, 140, 144 | 149, 153, 157, 161, 165 | 169, 173, 177, 181 |
| 40MHz Channel No. | 38, 46 | 54, 62 | 102, 110, 118, 126, 134, 142 | 151, 159, 167 | 175, ✕ |
| 80MHz Channel No. | 42 | 58 | 106, 122, 138 | 155, 171 | ✕ |
| 160MHz Channel No. | 50 | | 114, ✕ | 163 | |

FIG. 3

WIRELESS ACCESS POINT APPARATUS AND CHANNEL SWITCHING METHOD THEREOF

RELATED APPLICATIONS

This application claims priority to Taiwan Application Serial Number 111146212, filed on Dec. 1, 2022, which is herein incorporated by reference.

BACKGROUND

In the field of wireless communications, due to the lack of channels and insufficient bandwidth in the 2.4 GHz frequency band, most wireless access point apparatuses have adopted the 5 GHz frequency band to provide wireless access services for wireless transceiver devices, in order to satisfy the high-speed transmission requirements. However, a large part of the 5 GHz frequency band belongs to dynamic frequency selection (DFS) channels, and only certified wireless access point apparatuses can use the DFS channels. Since the 5 GHz frequency band has been opened for military radars and weather radars in a majority of areas, in order to prevent radar signals from being interfered, a wireless access point apparatus has to switch to another channel for keeping the wireless access services for the wireless transceiver devices when detecting that there is a radar signal in the same channel.

SUMMARY

One aspect of the present disclosure relates to a wireless access point apparatus, which includes a mixer, an analog low-pass filter (ALPF), an analog-to-digital converter (ADC), a radar detector, and a controller. The mixer is configured to mix a wireless signal and a carrier signal for performing frequency conversion on the wireless signal. The ALPF is coupled to the mixer and having a passband, the ALPF configured to perform filtering on the wireless signal, so as to filter out a signal component of the wireless signal outside the passband. The ADC is coupled to the ALPF, and the ADC is configured to convert the filtered wireless signal from an analog form to a digital form. At least one radar detector is coupled to the ADC, and the at least one radar detector is configured to detect whether the filtered wireless signal in the digital form includes any radar signal. The controller is coupled to the at least one radar detector, and the controller is configured to adjust a carrier frequency of the carrier signal according to a detection result of the at least one radar detector, so as to switch between at least one dynamic frequency selection (DFS) channel, a non-DFS channel and a composite channel.

Another aspect of the present disclosure relates to a channel switching method for a wireless access point apparatus, which includes: entering a DFS channel when the wireless access point apparatus is activated; detecting whether any radar signal is in the DFS channel; entering the non-DFS channel and setting the wireless access point apparatus to the half-bandwidth connection configuration for wireless communication connection when a radar signal is detected in the DFS channel; entering the combination channel and setting the wireless access point apparatus to a full-bandwidth connection configuration for wireless communication connection when there is no radar signal detected in the DFS channel, where the frequency band of the combination channel covers the frequency bands of DFS channels and non-DFS channels.

Yet another aspect of the present disclosure relates to a channel switching method for a wireless access point apparatus, which includes: entering a first DFS channel when the wireless access point apparatus is activated; detecting whether any radar signal is in the first DFS channel signal; entering the second DFS channel and detecting whether any radar signal is in the second DFS channel when a first radar signal is detected in the first DFS channel; setting the wireless access point apparatus to the first half-bandwidth connection configuration for wireless communication connection in the first DFS channel when there is a first radar signal detected in the first DFS channel; entering the non-DFS channel and setting the wireless access point apparatus to the first half-bandwidth connection configuration for wireless communication connection when there is a second radar signal in the second DFS channel; setting the wireless access point apparatus to the second half-bandwidth connection configuration for wireless communication connection when there is no radar signal detected in the second DFS channel.

BRIEF DESCRIPTION OF THE DRAWINGS

This disclosure can be more fully understood by reading the following detailed description of the embodiment, with reference made to the accompanying drawings as follows:

FIG. 3 is a list of Wi-Fi channels in a 5 GHz band.

DETAILED DESCRIPTION

Figure 1:
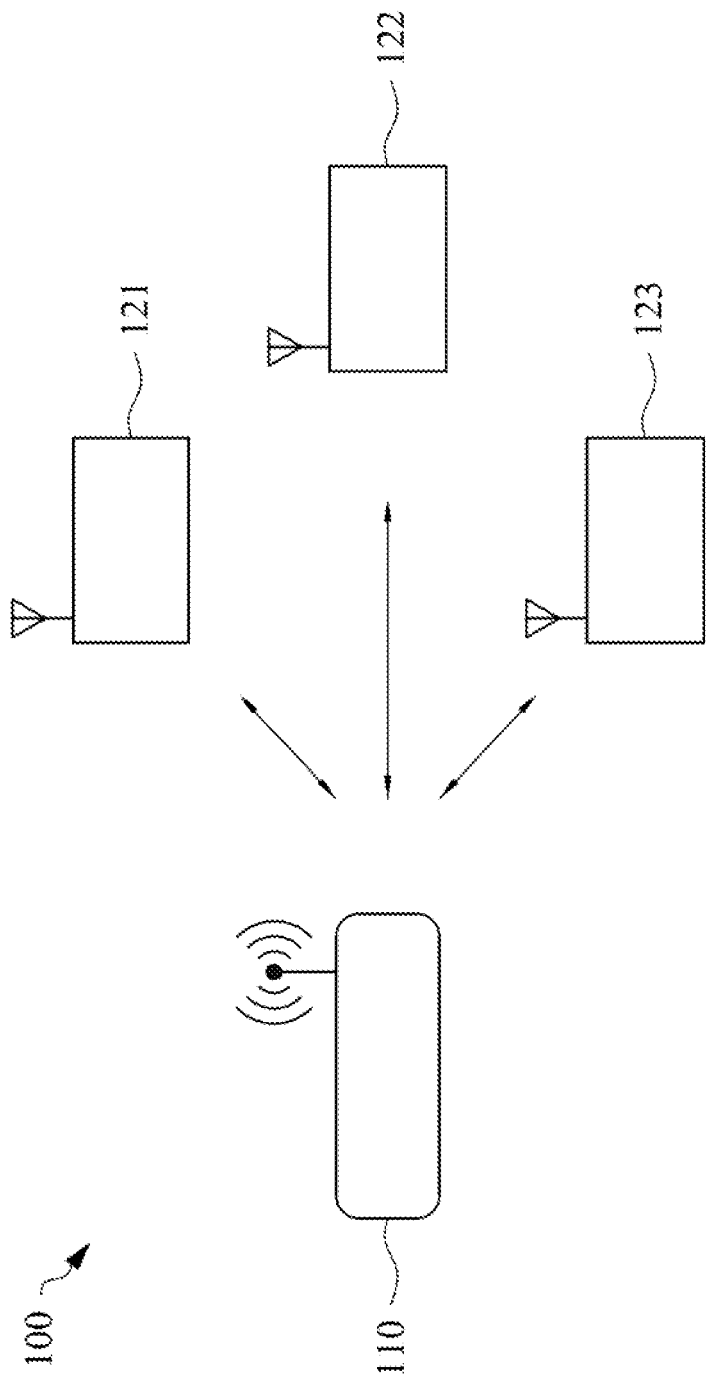
FIG. 1 is a schematic diagram of a wireless communication system in accordance with some embodiments of the present disclosure.

Reference will now be made in detail to the present embodiments of this disclosure, examples of which are illustrated in the accompanying drawings. Wherever possible, the same reference numbers are used in the drawings and the description to refer to the same or like parts.

FIG. 1 is a schematic diagram of a wireless communication system 100 in accordance with some embodiments of the present disclosure. The wireless communication system 100 includes a wireless access point apparatus 110 and wireless transceiver devices 121-123. The wireless access point apparatus 110 provides wireless access services within a certain range, and each of the wireless transceiver devices 121-123 may communicate with the wireless access point apparatus 110 through a Wi-Fi channel (such as an IEEE 802.11 channel) to access a local network and/or an external network (such as the Internet). A wireless communication connection between the wireless access point apparatus 110 and any of the wireless transceiver devices 121-123 may include but not limited to registration procedure(s), identity verification and access procedure(s), establishment and release of wireless connection(s), and transmission and/or reception of control signal(s) and/or data packet(s), etc. Each of the wireless transceiver devices 121-123 may be, for example, a smartphone, a tablet computer, a laptop computer or a device with a wireless transceiver function. In addition, the wireless access point apparatus 110 may be, for example, a wireless router, a wireless switch, or a wireless transceiver device with an access point function. It should be noted that the number of wireless transceiver devices disclosed in the present disclosure is not limited to that shown in FIG. 1.

Figure 2:
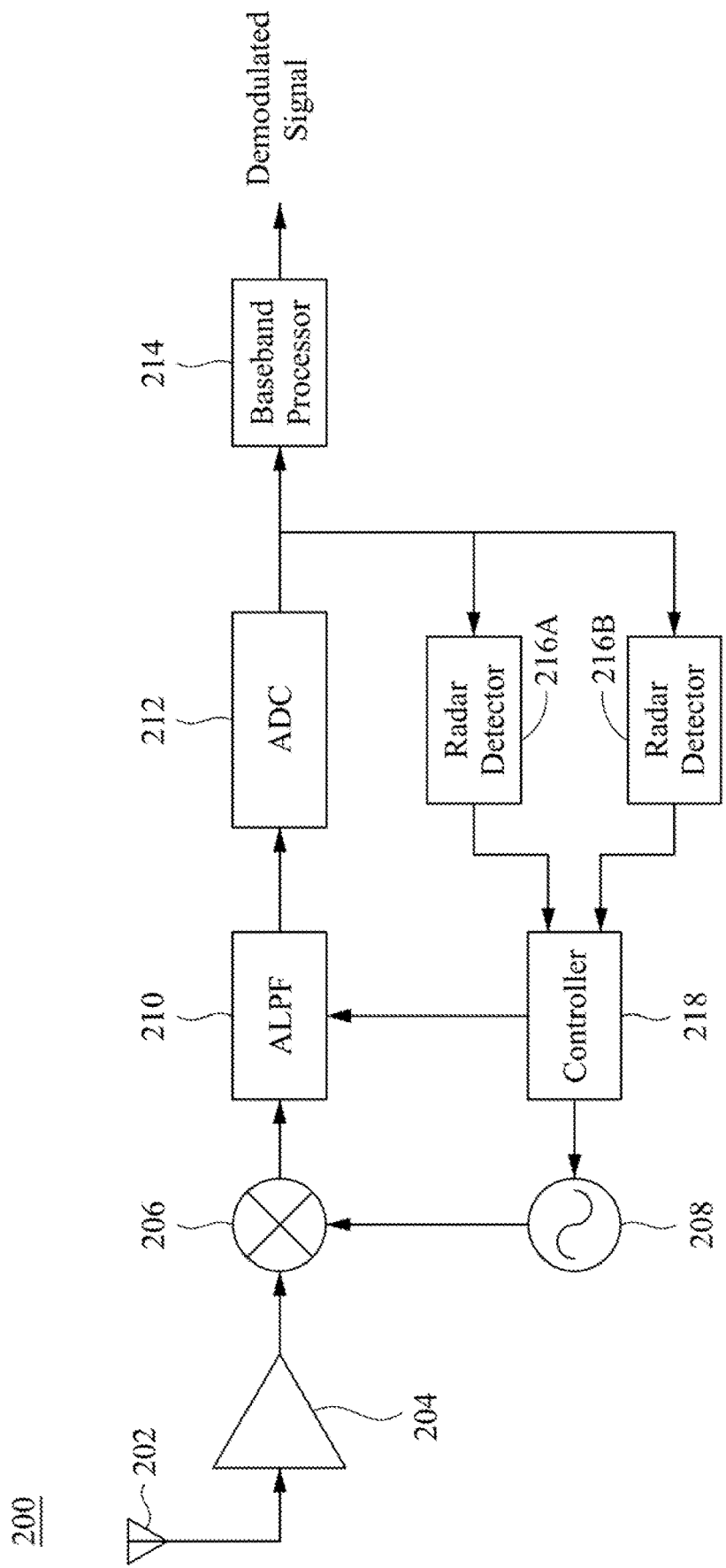
FIG. 2 is a circuit block diagram of the wireless access point apparatus in accordance with some embodiments of the present disclosure.

FIG. 2 is a circuit block diagram of a wireless access point apparatus 200 in accordance with some embodiments of the present disclosure. The wireless access point apparatus 200 may be the wireless access point apparatus 110 shown in FIG. 1 or another similar wireless access point apparatus, and supports Wi-Fi wireless communications in a 5 GHz band. The wireless access point apparatus 200 includes an antenna 202, a low-noise amplifier (LNA) 204, a mixer 206, a local oscillator 208, an analog low-pass filter (ALPF) 210, an analog-to-digital converter (ADC) 212, a baseband processor 214, radar detectors 216A, 216B and a controller 218.

The antenna 202 is configured to receive a radio frequency wireless signal, and the low-noise amplifier 204 is configured to increase a signal-to-noise ratio of a wireless signal. The mixer 206 is configured to mix the wireless signal and a carrier signal generated by the local oscillator 208 for performing frequency conversion on the wireless signal. The ALPF 210 is coupled to the mixer 206, and has a passband for filtering the wireless signal to filter out signal component(s) of the wireless signal outside thereof. The ADC 212 is coupled to the ALPF 210, and is configured to convert the filtered wireless signal from its analog form to a digital form. The baseband processor 214 is coupled to the ADC 212, and is configured to demodulate the filtered wireless signal in the digital form to obtain a demodulated signal. The radar detectors 216A, 216B are coupled to the ADC 212, and are configured to detect whether the filtered wireless signal in the digital form includes any radar signal. A status of each of the radar detectors 216A, 216B may be set to a channel availability check status, a service monitoring status or a shutdown status according to a channel currently entered by the wireless access point apparatus 200 and whether the wireless access point apparatus 200 is in a wireless communication connection with any wireless communication device. The controller 218 adjusts an oscillating frequency of the local oscillator 208 (that is, a carrier frequency of the carrier signal) according to the detection results of the radar detectors 216A and 216B, so as to achieve channel switching between DFS channel(s), non-DFS channel(s) and composite channel(s) (with a greater bandwidth relative to the DFS channel(s) and the non-DFS channel(s)).

FIG. 3 is a list of Wi-Fi channels in the 5 GHz band. As shown in FIG. 3, the 5 GHz band is divided into five bands including U-NII-1, U-NII-2A, U-NII-2C, U-NII-3, and U-NII-4, and has a number of channels with bandwidths of 20 MHZ, 40 MHz, 80 MHz and 160 MHz that are represented by different numerals. However, as shown in FIG. 3, in the current 5 GHz band, only Channels 50, 114, and 163 have a bandwidth of 160 MHz, in which Channel 50, 114 further cover the DFS channels, and Channel 120, 124 and 128 covered by Channel 114 are terminal Doppler weather radar (TDWR) channels. Therefore, how to achieve seamless DFS channel switching and a composite channel with a bandwidth of 160 MHz for transmissions by utilizing the existing radio frequency circuit under the limited number of channels and the existence of the DFS channels and the TDWR channels for optimization of channel usage is a main issue to be solved in the present disclosure.

Figure 4:
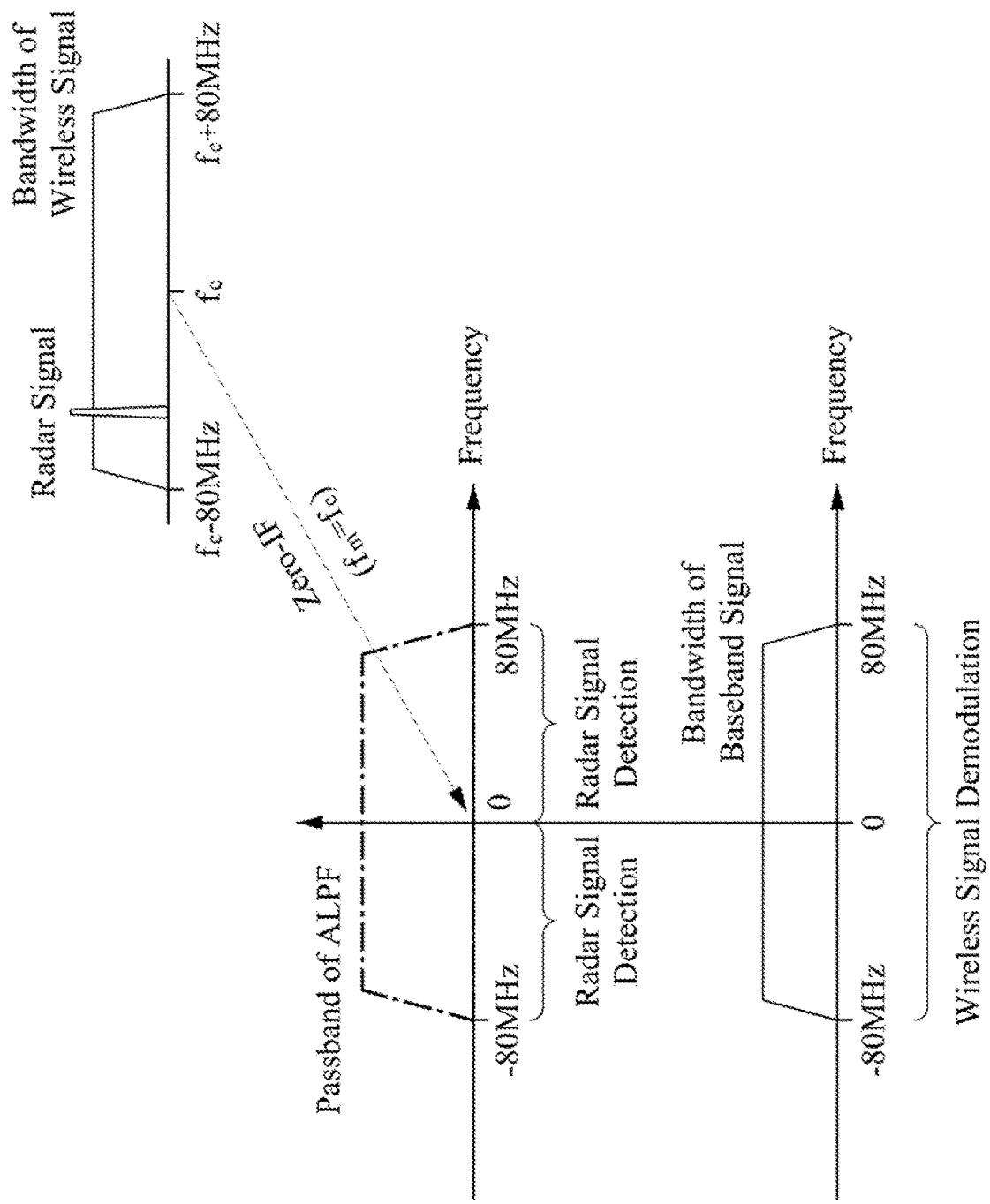
FIG. 4 to FIG. 7 are schematic diagrams of a full-bandwidth connection configuration, an upper half-bandwidth connection configuration, a lower half-bandwidth connection configuration, and an activation configuration of a wireless access point apparatus in accordance with some embodiments of the present disclosure.

FIG. 4 schematically shows a radar signal detection and a wireless signal demodulation of the wireless access point apparatus 200 in a full-bandwidth connection configuration in accordance with some embodiments of the present disclosure. The wireless access point apparatus 200 has a zero intermediate frequency (Zero-IF) architecture in the full-bandwidth connection configuration, i.e., the carrier frequency $f_m$ is equal to the center frequency $f_c$ of a frequency band of the wireless signal (of which the frequency is $f_c$−80 MHz to $f_c$+80 MHZ), such that the frequency band of the wireless signal with a bandwidth of 160 MHz is shifted directly from a radio frequency to a baseband frequency, for the baseband processor 214 to demodulate the wireless signal. After the frequency down-conversion by the mixer 206 and the filtering by the ALPF 210 (of which the passband frequency is −80 MHz to 80 MHZ), the radar detectors 216A and 216B may be respectively configured to detect whether any radar signal is present in the frequency band of −80 MHz to 0 and in the frequency band of 0 to 80 MHz.

Figure 5:
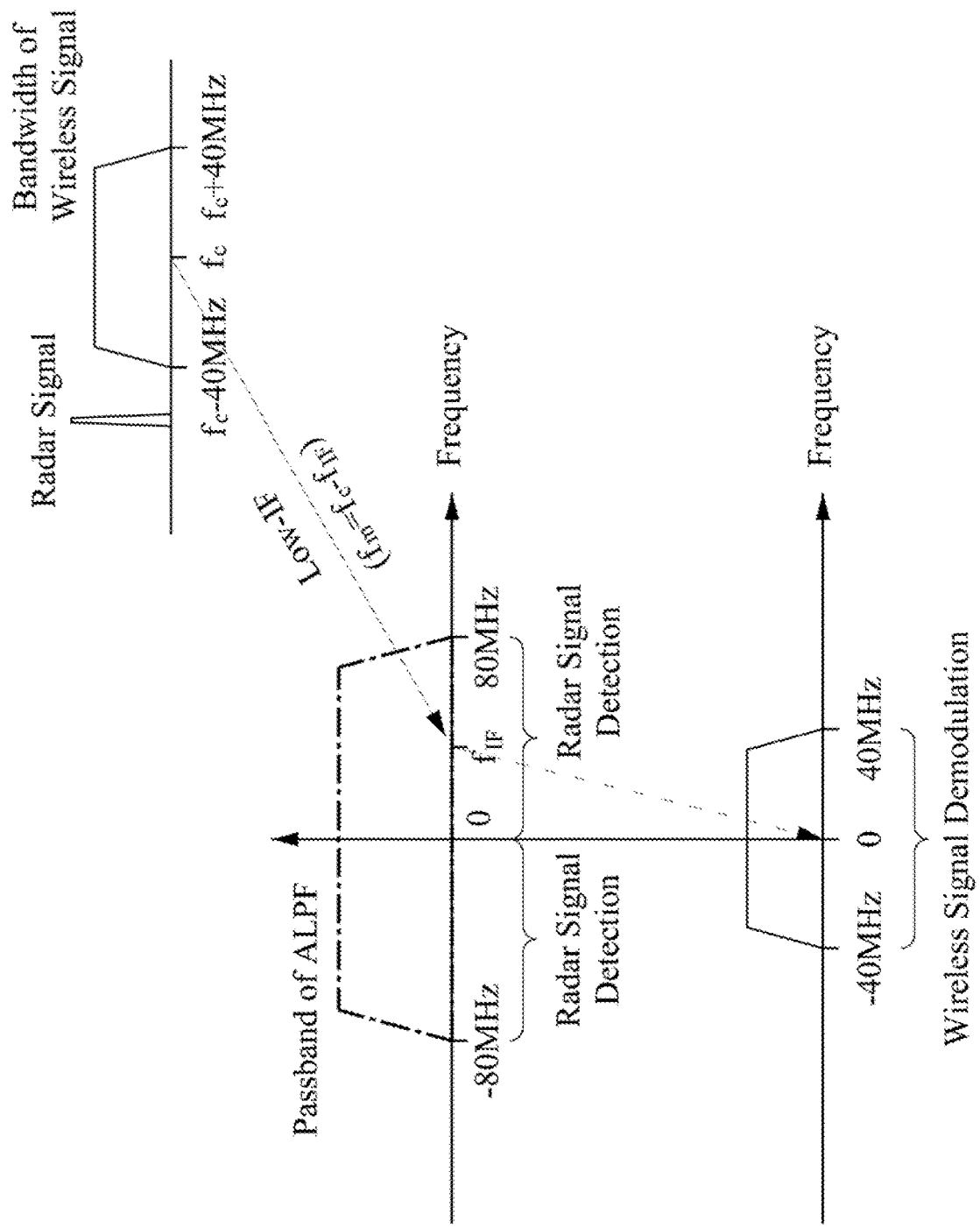

FIG. 5 schematically shows a radar signal detection and a wireless signal demodulation of the wireless access point apparatus 200 in an upper half-bandwidth connection configuration in accordance with some embodiments of the present disclosure. The wireless access point apparatus 200 has a low intermediate frequency (Low-IF) architecture in the upper half-bandwidth connection configuration, in which the carrier frequency $f_m$ is equal to the center frequency $f_c$ of the frequency band of the wireless signal (of which the frequency is $f_c$−40 MHz to $f_c$+40 MHZ) minus the intermediate frequency $f_{IF}$ (between 0 and 80 MHz), such that the frequency band of the wireless signal with a bandwidth of 80 MHz is shifted directly from the radio frequency to the intermediate frequency and then further shifted from the intermediate frequency to the baseband frequency for the baseband processor 214 to demodulate the wireless signal. After the frequency down-conversion by the mixer 206 and the filtering by the ALPF 210 (of which the passband frequency is −80 MHz to 80 MHZ), the radar detectors 216A and 216B may be respectively configured to detect whether any radar signal is present in the frequency band of −80 MHz to 0 and in the frequency band of 0 to 80 MHz.

Figure 6:
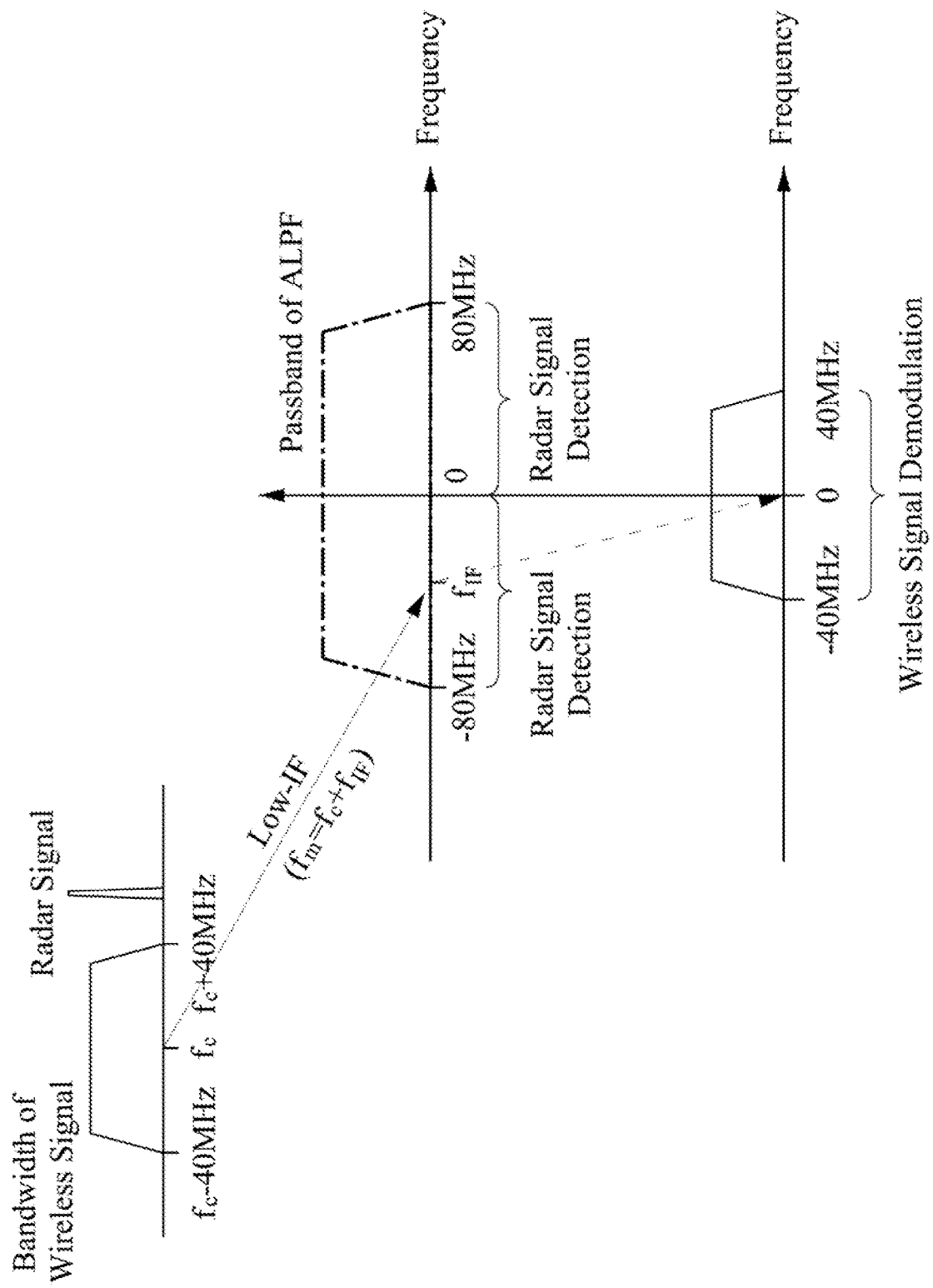

FIG. 6 schematically shows a radar signal detection and a wireless signal demodulation of the wireless access point apparatus 200 in a lower half-bandwidth connection configuration in accordance with some embodiments of the present disclosure. The wireless access point apparatus 200 has a low intermediate frequency architecture in the lower half-bandwidth connection configuration, in which the carrier frequency $f_m$ is equal to the center frequency $f_c$ of the frequency band of the wireless signal (of which the frequency is $f_c$−40 MHZ to $f_c$+40 MHZ) plus the intermediate frequency $f_{IF}$, such that the frequency band of the wireless signal with a bandwidth of 80 MHz is shifted directly from the radio frequency to the intermediate frequency (between −80 MHz and 0) and then further shifted from the intermediate frequency to the baseband frequency for the baseband processor 214 to demodulate the wireless signal. After the frequency down-conversion by the mixer 206 and the filtering by the ALPF 210 (of which the passband frequency is −80 MHz to 80 MHZ), the radar detectors 216A and 216B may be respectively configured to detect whether any radar signal is present in the frequency band of −80 MHz to 0 and in the frequency band of 0 to 80 MHz.

Figure 7:
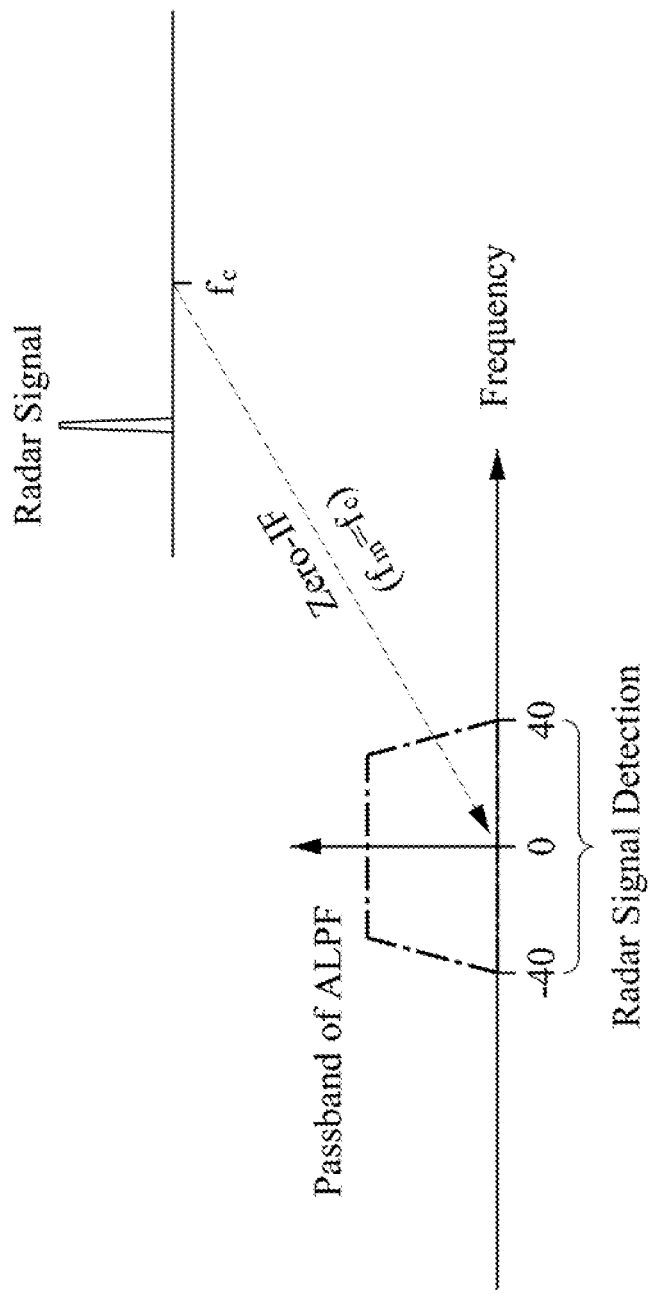

FIG. 7 schematically shows a radar signal detection of the wireless access point apparatus 200 in an active configuration in accordance with some embodiments of the present disclosure. The activation configuration shown in FIG. 7 is adapted to the wireless access point apparatus 200 that is activated but not connected to a wireless transceiver device for wireless communications. The wireless access point apparatus 200 has a zero-IF architecture in the activation configuration, in which the carrier frequency $f_m$ is equal to the center frequency $f_c$ of the frequency band of the wireless signal (in which the frequency is $f_c$–40 MHZ to $f_c$+40 MHZ), such that the frequency band of the wireless signal with a bandwidth of 80 MHz is shifted directly from the radio frequency to the baseband frequency, and then the radar detector 216A or 216B detects whether any radar signal is present in the frequency band of –40 MHz to 40 MHz.

Figure 8:
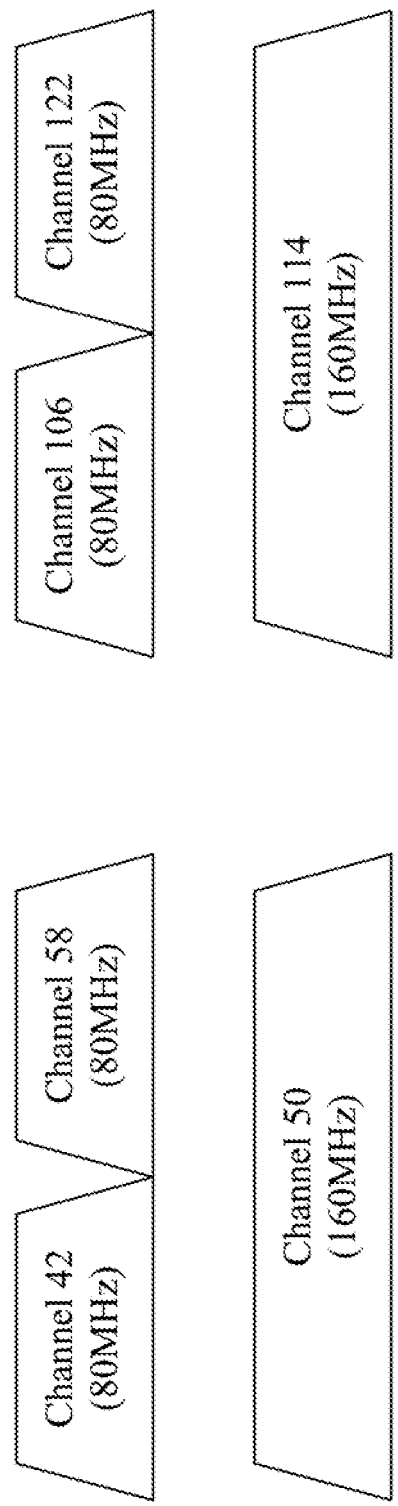
FIG. 8 shows the correspondence between two composite channels each with a bandwidth of 160 MHz and their sub-channels each with a bandwidth of 80 MHz.

FIG. 8 shows the correspondence between two composite channels (Channels 50 and 114) each with a bandwidth of 160 MHz and their sub-channels (Channels 42, 58, 106, and 122) each with a bandwidth of 80 MHz. It can be seen from the channel list shown in FIG. 3 that Channels 58, 106, and 122 are DFS channels. In addition to Channel 42, Channels 50, 58, 106, 114, and 122 all cover DFS channels, and Channel 122 further covers a TDWR channel.

Figure 9:
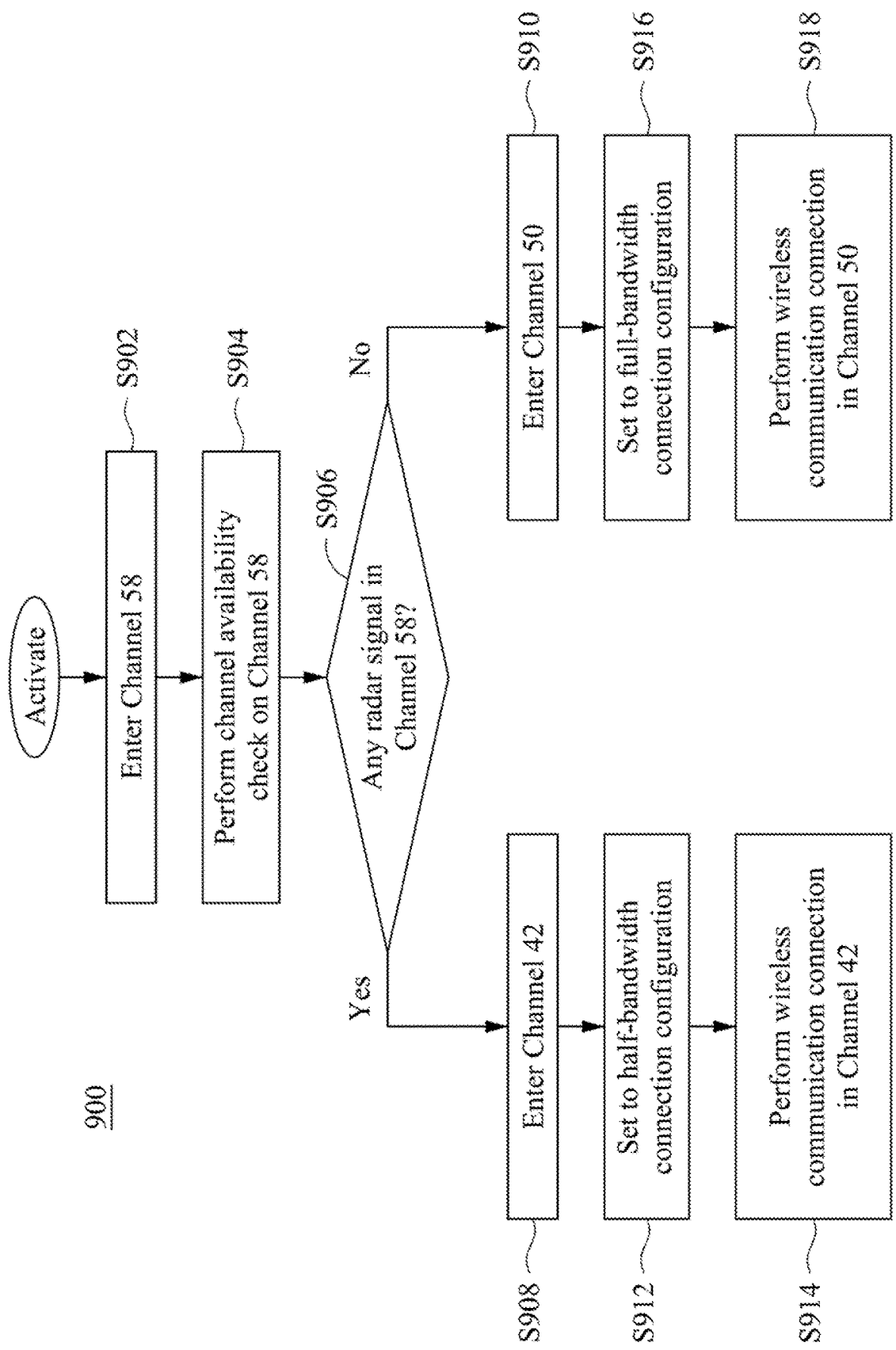
FIG. 9 to FIG. 15 are flowcharts of channel switching methods in accordance with some embodiments of the present disclosure.
Figure 10:
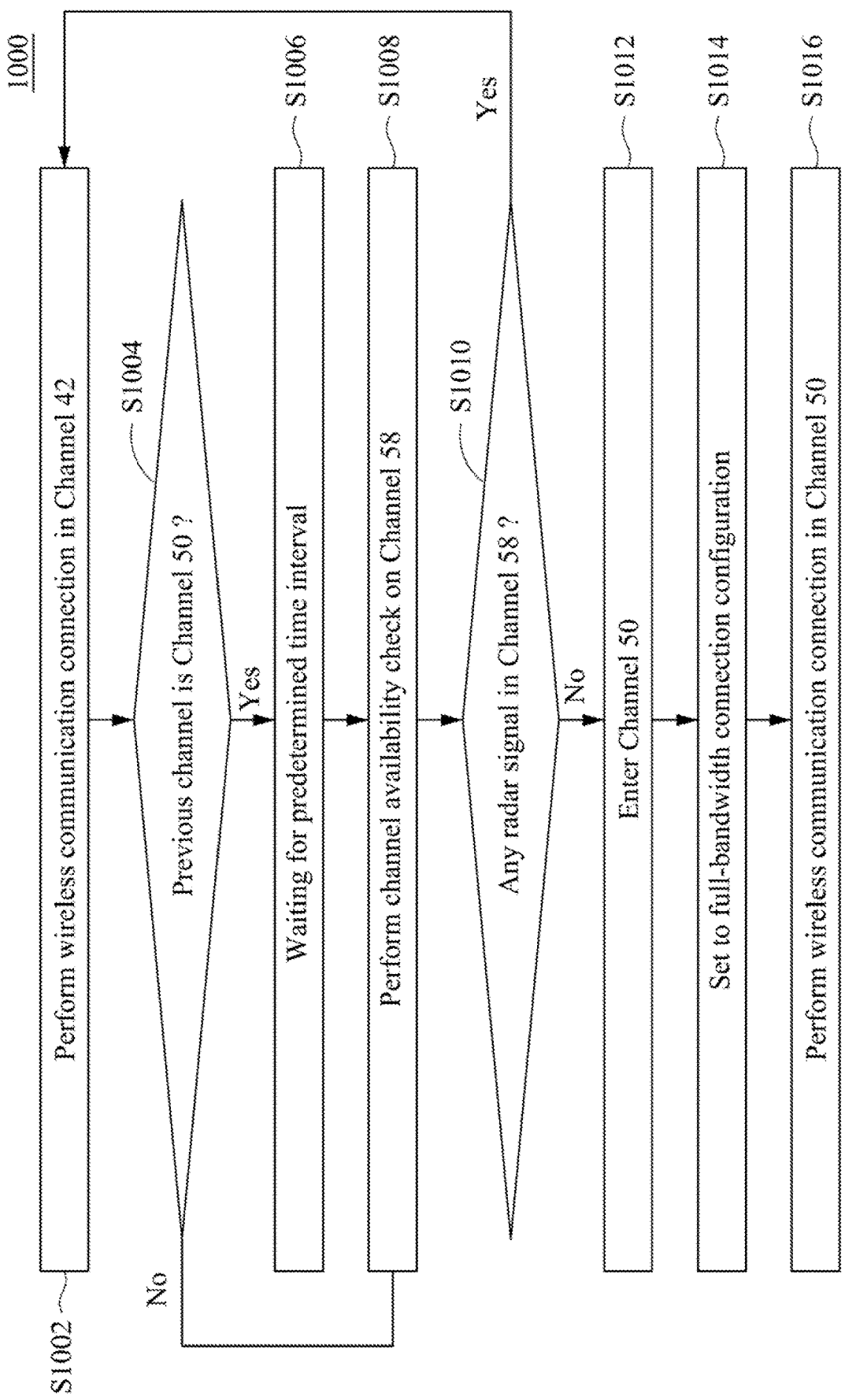
Figure 11:
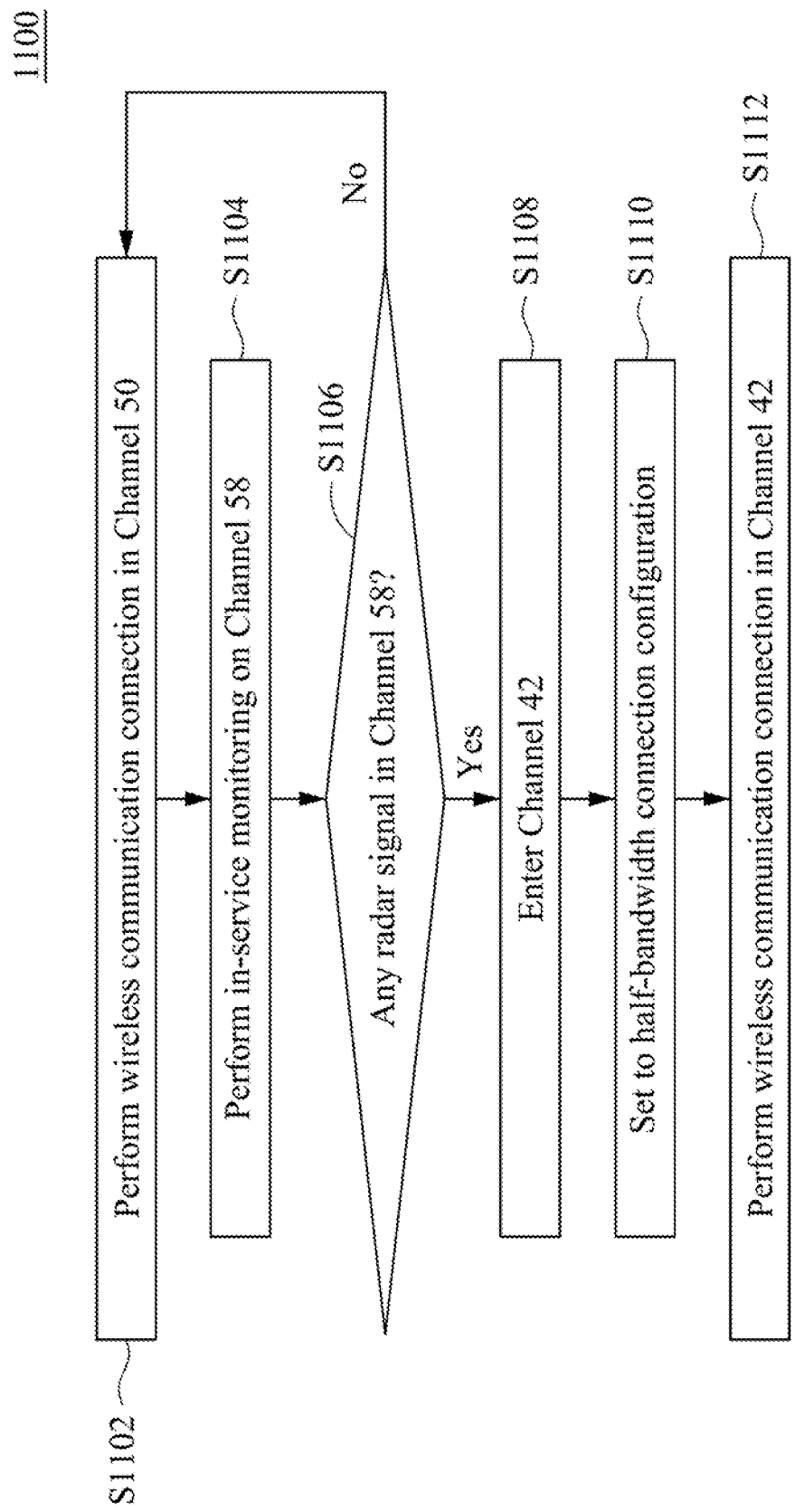

FIGS. 9-11 are an example of channel switching of a wireless access point apparatus in accordance with some embodiments of the present disclosure. FIG. 9 shows a channel switching method 900 of a wireless access point apparatus that is activated and enters a DFS channel. FIG. 10 is a channel switching method 1000 of a wireless access point apparatus that enters a non-DFS channel and performs wireless communication connections with a wireless transceiver device. FIG. 11 is a channel switching method 1100 of a wireless access point apparatus that enters a composite channel and performs wireless communication connections with a wireless transceiver device. The channel switching examples shown in FIGS. 9-11 are applicable to the wireless access point apparatus 200 of FIG. 2 or another similar wireless access point apparatus.

In Step S902, the wireless access point apparatus enters Channel 58 (which is a DFS channel) when activated. At this time, no wireless communication connection is performed with any wireless transceiver device, and thus no wireless signal transmission is present. Then, in Step S904, the wireless access point apparatus is set to an activation configuration (e.g., the activation configuration shown in FIG. 7), and a channel availability check is performed on Channel 58, and then Step S906 is performed to detect whether any radar signal is present in Channel 58. If there is a radar signal in Channel 58, then Step S908 is performed, in which the wireless access point apparatus leaves Channel 58 and enters Channel 42 (which is a non-DFS channel). On the contrary, if there is no radar signal in Channel 58, then Step S910 is performed, in which the wireless access point apparatus leaves Channel 58 and enters Channel 50 (which is a composite channel). After Step S908, Step S912 is performed, in which the wireless access point apparatus is set to a half-bandwidth connection configuration (e.g., the lower half-bandwidth connection configuration shown in FIG. 6), and then Step S914 is performed for a wireless communication connection with a wireless transceiver device in Channel 42. After Step S910, Step S916 is performed, in which the wireless access point apparatus is set to a full-bandwidth connection configuration (e.g., the full-bandwidth connection configuration shown in FIG. 4), and then Step S918 is performed for a wireless communication connection with a wireless transceiver device in Channel 50.

In Step S1002, the wireless access point apparatus is set to a half-bandwidth connection configuration (e.g., the lower half-bandwidth connection configuration shown in FIG. 6) to perform a wireless communication connection with the wireless transceiver device in Channel 42. Next, after a predetermined time interval (such as a channel availability check interval of 1 minute), Step S1004 is performed to determine whether a previous channel entered before Channel 42 is Channel 50. If yes, then Step S1006 is performed to wait for a predetermined time (such as 30 minutes of non-occupancy time), and then Step S1008 is performed for a channel availability check on Channel 58 after the predetermined time elapses. Otherwise, Step S1008 is performed directly without waiting for the predetermined time. After Step S1008, Step S1010 is performed to detect whether any radar signal is present in Channel 58. If there is a radar signal in Channel 58, then Step S1002 is performed to keep the wireless communication connection with the wireless transceiver device in Channel 42. On the contrary, if there is no radar signal in Channel 58, then Step S1012 is performed, in which the wireless access point apparatus leaves Channel 58 and enters Channel 50, and sends a channel switch announcement (CSA) message to the wireless transceiver device to notify (e.g., instruct) the wireless transceiver device to switch to Channel 50. After Step S1012, Step S1014 is performed, in which the wireless access point apparatus is set to a full-bandwidth connection configuration (e.g., the full-bandwidth connection configuration shown in FIG. 4), and then Step S1016 is performed for the wireless communication connection with the wireless transceiver device in Channel 50.

In Step S1102, the wireless access point apparatus is set to a full-bandwidth connection configuration (e.g., the full-bandwidth connection configuration shown in FIG. 4) to perform a wireless communication connection with the wireless transceiver device in Channel 50. Then, Step S1104 is performed for in-service monitoring on Channel 50, and then Step S1106 is performed to detect whether any radar signal is present in Channel 58. If there is a radar signal in Channel 58, then Step S1108 is performed, in which the wireless access point apparatus leaves Channel 58 and enters Channel 42, and sends a CSA message to the wireless transceiver device to notify the wireless transceiver device to switch to Channel 42. On the contrary, if there is no radar signal in Channel 58, then Step S1102 is performed to keep the wireless communication connection with the wireless transceiver device in Channel 50. After Step S1108, Step S1110 is performed, in which the wireless access point apparatus is set to a half-bandwidth connection configuration (e.g., the lower half-bandwidth connection configuration shown in FIG. 6), and then Step S1112 is performed for the wireless communication connection with the wireless transceiver device in Channel 42.

Figure 12:
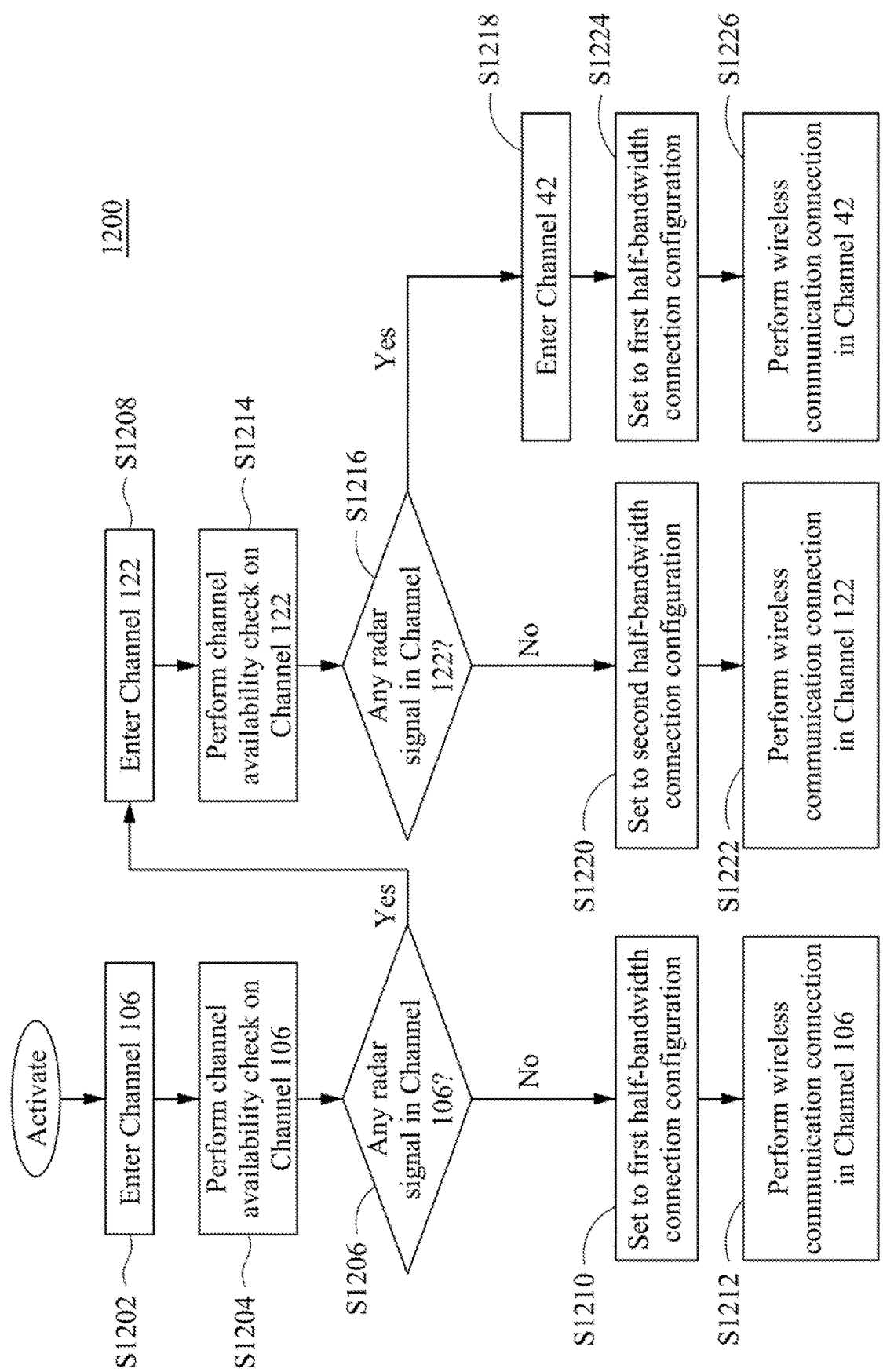
Figure 13:
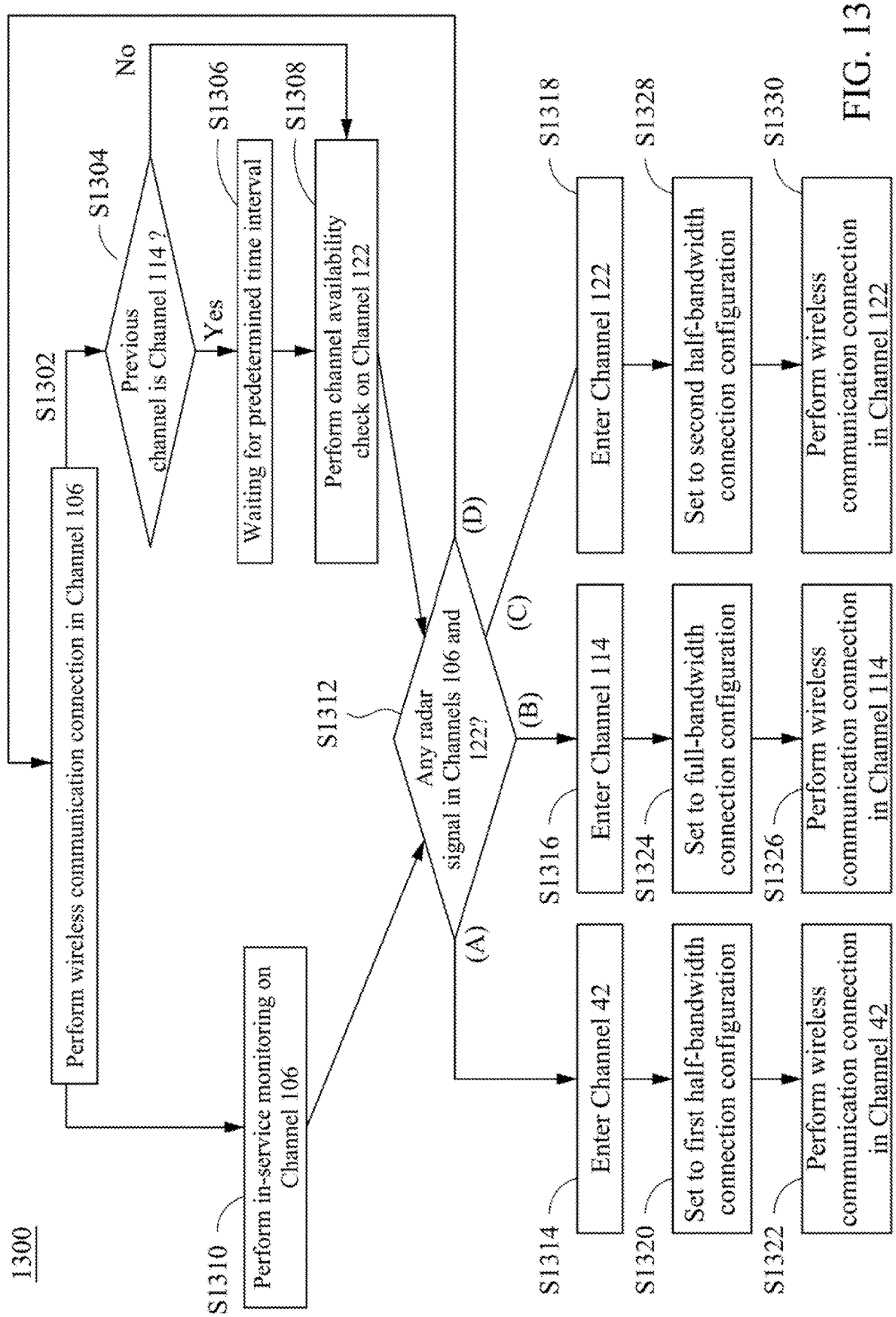
Figure 14:
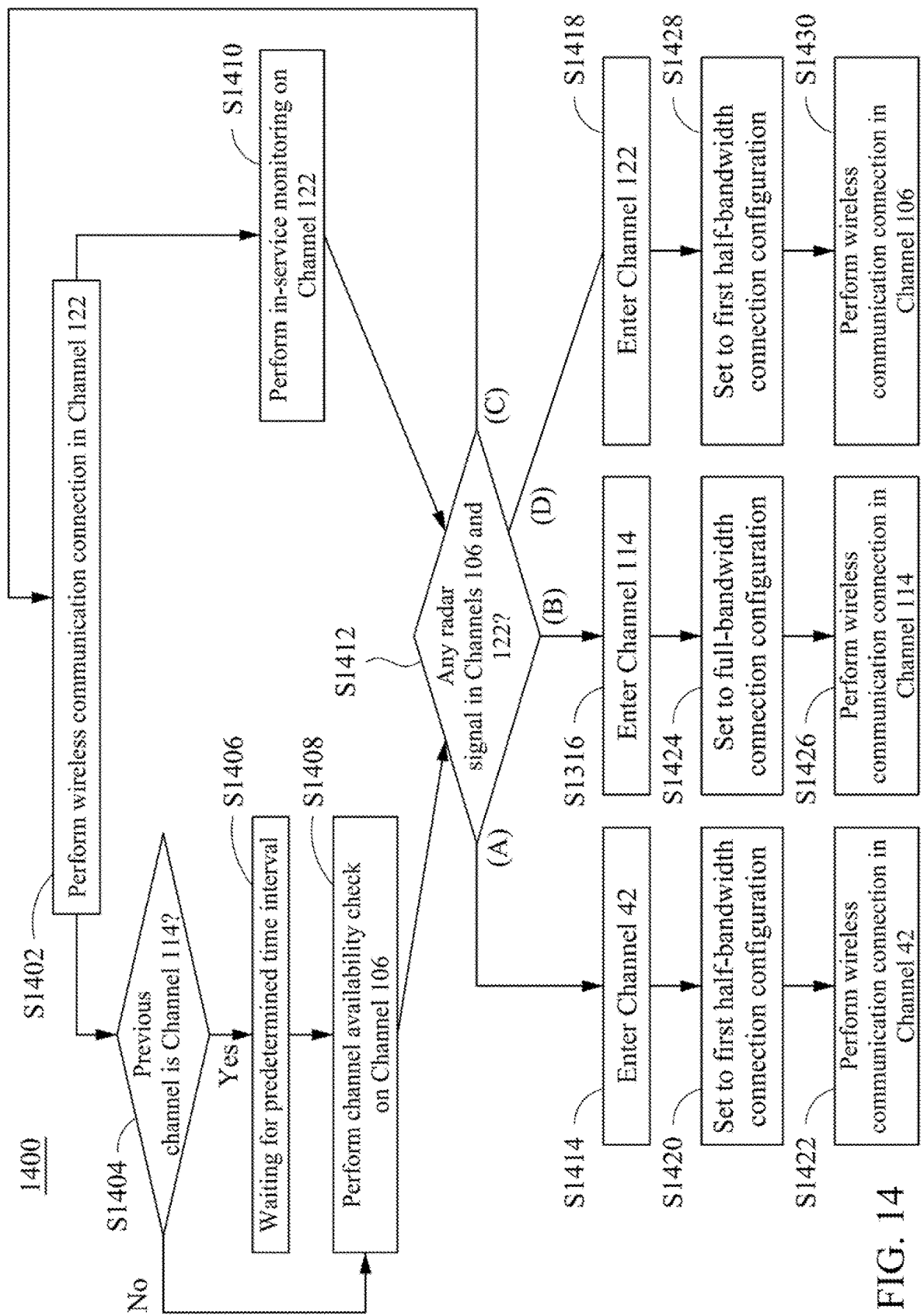
Figure 15:
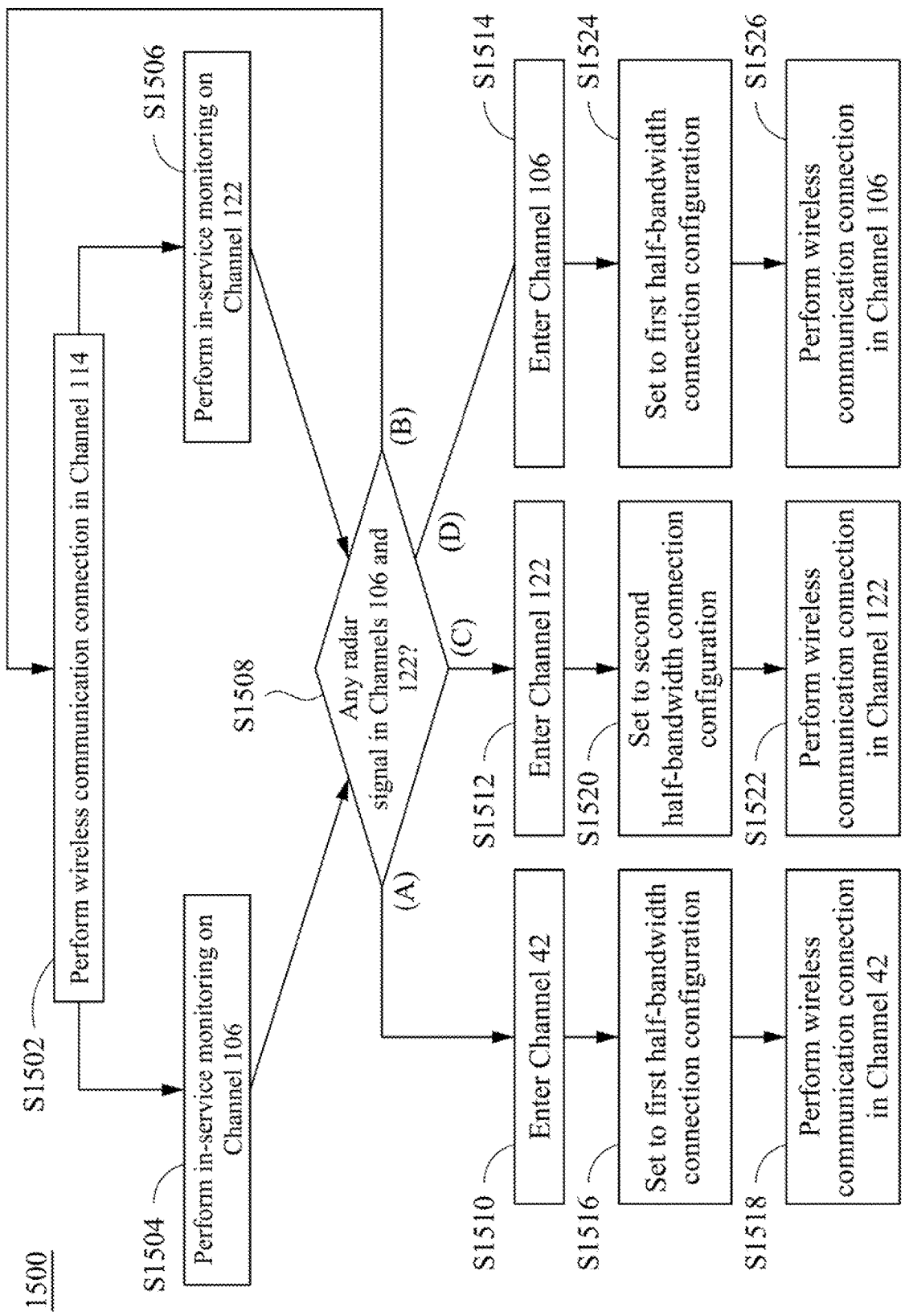

FIGS. 12-15 are another example of channel switching of a wireless access point apparatus in accordance with some embodiments of the present disclosure. FIG. 12 shows a channel switching method 1200 for a wireless access point apparatus that is activated and enters a DFS channel without covering a TDWR channel. FIG. 13 shows a channel switching method 1300 for a wireless access point apparatus that enters a DFS channel without covering a TDWR channel and performs a wireless communication connection with a wireless transceiver device. FIG. 14 shows a channel switching method 1400 for a wireless access point apparatus that enters a DFS channel covering a TDWR channel and performs a wireless communication connection with a wireless transceiver device. FIG. 15 is a channel switching method 1500 of a wireless access point apparatus that enters a composite channel and performs a wireless communication connection with a wireless transceiver device. The examples of channel switching shown in FIGS. 12-15 are also applicable to the wireless access point apparatus 200 of FIG. 2 or another similar wireless access point apparatus.

In Step S1202, the wireless access point apparatus enters Channel 106 (which is a DFS channel) when activated. At this time, no wireless communication connection is performed with any wireless transceiver device, and thus no wireless signal transmission is present. Then, in Step S1204, the wireless access point apparatus is set to an activation configuration (e.g., the activation configuration shown in FIG. 7), and a channel availability check is performed on Channel 106, and then Step S1206 is performed to detect whether any radar signal is present in Channel 106. If there is a radar signal in Channel 106, then Step S1208 is performed, in which the wireless access point apparatus leaves Channel 106 and enters Channel 122 (which is also a DFS channel). On the contrary, if there is no radar signal in Channel 106, then Step S1210 is performed, in which the wireless access point apparatus is set to a first half-bandwidth connection configuration (e.g., the lower half-bandwidth connection configuration shown in FIG. 6), and then Step S1212 is performed for a wireless communication connection with the wireless transceiver device in Channel 106. After Step S1208, Step S1214 is performed to check the channel availability of Channel 122, and then Step S1216 is performed to detect whether any radar signal is present in Channel 122. If there is a radar signal in Channel 122, then Step S1218 is performed, in which the wireless access point apparatus leaves Channel 122 and enters Channel 42 (which is a non-DFS channel). On the contrary, if there is no radar signal in Channel 122, then Step S1220 is performed, in which the wireless access point apparatus is set to a second half-bandwidth connection configuration (e.g., the upper half-bandwidth connection configuration shown in FIG. 5), and then Step S1222 is performed for a wireless communication connection with the wireless transceiver device in Channel 122. After Step S1218, Step S1224 is performed, in which the wireless access point apparatus is set to the first half-bandwidth connection configuration (e.g., the lower half-bandwidth connection configuration shown in FIG. 6), and then Step S1226 is performed for a wireless communication connection with the wireless transceiver device in Channel 42.

In Step S1302, the wireless access point apparatus is set to a first half-bandwidth connection configuration (e.g., the lower half-bandwidth connection configuration shown in FIG. 6) to perform a wireless communication connection with the wireless transceiver device in Channel 106. Next, after a predetermined time interval (e.g., a channel availability check interval of 1 minute), Step S1304 is performed to determine whether a previous channel entered before Channel 106 is Channel 114. If yes, Step S1306 is performed to wait for a predetermined time (e.g., non-occupancy time of 30 minutes), and Step S1308 is performed for a channel availability check on Channel 122 after the predetermined time elapses. Otherwise, Step S1308 is performed directly without waiting for the predetermined time. After Step S1302, Step S1310 is also performed at the same time for in-service monitoring on Channel 106. After Steps S1308 and S1310, Step S1312 is performed to detect whether any radar signal is present in Channels 106 and 122. (A) If there are radar signals respectively in Channels 106 and 122, then Step S1314 is performed, in which the wireless access point apparatus leaves Channel 106 and enters Channel 42, and sends a CSA message to the wireless transceiver device to notify the wireless transceiver device to switch to Channel 42. (B) If there is no radar signal in any of Channels 106 and 122, then Step S1316 is performed, in which the wireless access point apparatus leaves Channel 106 and enters Channel 114, and sends a CSA message to the wireless transceiver device to notify the wireless transceiver device to switch to Channel 114. (C) If there is a radar signal in Channel 106 but there is no radar signal in Channel 122, then Step S1318 is performed, in which the wireless access point apparatus leaves Channel 106 and enters Channel 122, and sends a CSA message to the wireless transceiver device to notify the wireless transceiver device to switch to Channel 122. (D) If there is no radar signal in Channel 106 but there is a radar signal in Channel 122, then Step S1302 is performed to keep the wireless communication connection with the wireless transceiver device in Channel 106. After Step S1314, Step S1320 is performed, in which the wireless access point apparatus is set to a first half-bandwidth connection configuration (e.g., the lower half-bandwidth connection configuration shown in FIG. 6), and then Step S1322 is performed for the wireless communication connection with the wireless transceiver device in Channel 42. After Step S1316, Step S1324 is performed, in which the wireless access point apparatus is set to a full-bandwidth connection configuration (e.g., the full-bandwidth connection configuration shown in FIG. 4), and then Step S1326 is performed for the wireless communication connection with the wireless transceiver device in Channel 114. After Step S1318, Step S1328 is performed, in which the wireless access point apparatus is set to a second half-bandwidth connection configuration (e.g., the upper half-bandwidth connection configuration shown in FIG. 5), and then Step S1330 is performed for the wireless communication connection with wireless transceiver device in Channel 122.

In Step S1402, the wireless access point apparatus is set to a second half-bandwidth connection configuration (e.g., the upper half-bandwidth connection configuration shown in FIG. 5), and performs a wireless communication connection with the wireless transceiver device in Channel 122. Next, after a predetermined time interval (e.g., a channel availability check interval of 1 minute), Step S1404 is performed to determine whether a previous channel entered before Channel 122 is Channel 114. If yes, then Step S1406 is performed to wait for a predetermined time (such as 30 minutes of non-occupancy time), and then Step S1408 is performed for a channel availability check on Channel 106 after the predetermined time elapses. Otherwise, Step S1408 is performed directly without waiting for the predetermined time. After Step S1402, Step S1410 is also performed at the same time for in-service monitoring on Channel 122. After Steps S1408 and S1410, Step S1412 is performed to detect whether any radar signal is present in Channels 106 and 122. (A) If there are radar signals respectively in Channels 106 and 122, then Step S1414 is performed, in which the wireless access point apparatus leaves Channel 122 and enters Channel 42, and sends a CSA message to the wireless transceiver device to notify the wireless transceiver device to switch to Channel 42. (B) If there is no radar signal in any of Channels 106 and 122, then Step S1416 is performed, in which the wireless access point apparatus leaves Channel 122 and enters Channel 114, and sends a CSA message to the wireless transceiver device to notify the wireless transceiver device to switch to Channel 114. (C) If there is a radar signal in Channel 106 but there is no radar signal in Channel 122, then Step S1402 is performed to keep the wireless communication connection with the wireless transceiver device in Channel 122. (D) If there is no radar signal in Channel 106 but there is a radar signal in Channel 122, then Step S1418 is performed, in which the wireless access point apparatus leaves Channel 122 and enters Channel 106, and sends a CSA message to the wireless transceiver device to notify the wireless transceiver device to switch to Channel 106. After Step S1414, Step S1420 is performed, in which the wireless access point apparatus is set to a first half-bandwidth connection configuration (e.g., the lower half-bandwidth connection configuration shown in FIG. 6), and then Step S1422 is performed for the wireless communication connection with the wireless transceiver device in Channel 42. After Step S1416, Step S1424 is performed, in which the wireless access point apparatus is set to a full-bandwidth connection configuration (e.g., the full-bandwidth connection configuration shown in FIG. 4), and then Step S1426 is performed for the wireless communication connection with the wireless transceiver device in Channel 114. After Step S1418, Step S1428 is performed, in which the wireless access point apparatus is set to a first half-bandwidth connection configuration (e.g., the lower half-bandwidth connection configuration shown in FIG. 6), and then Step S1430 is performed for the wireless communication connection with the wireless transceiver device in Channel 106.

In Step S1502, the wireless access point apparatus is set to a full-bandwidth connection configuration (e.g., the full-bandwidth connection configuration shown in FIG. 4), and performs a wireless communication connection with the wireless transceiver device in Channel 114. Next, Steps S1504 and S1506 are performed simultaneously for in-service monitoring on Channels 106 and 122, respectively. After Steps S1504 and S1506, Step S1508 is performed to detect whether any radar signal is present in Channels 106 and 122. (A) If there are radar signals respectively in Channels 106 and 122, then Step S1510 is performed, in which the wireless access point apparatus leaves Channel 114 and enters Channel 42, and sends a CSA message to the wireless transceiver device to notify the wireless transceiver device to switch to Channel 42. (B) If there is no radar signal in any of Channels 106 and 122, then Step S1502 is performed to keep the wireless communication connection with the wireless transceiver device in Channel 122. (C) If there is a radar signal in Channel 106 but there is no radar signal in Channel 122, then Step S1512 is performed, in which the wireless access point apparatus leaves Channel 114 and enters Channel 122, and sends a CSA message to the wireless transceiver device to notify the wireless transceiver device to switch to Channel 122. (D) If there is no radar signal in Channel 106 but there is a radar signal in Channel 122, then Step S1514 is performed, in which the wireless access point apparatus leaves Channel 114 and enters Channel 106, and sends a CSA message to the wireless transceiver device to notify the wireless transceiver device to switch to Channel 106. After Step S1510, Step S1516 is performed, in which the wireless access point apparatus is set to a first half-bandwidth connection configuration (e.g., the lower half-bandwidth connection configuration shown in FIG. 6), and then Step S1518 is performed for the wireless communication connection with the wireless transceiver device in Channel 42. After Step S1512, Step S1520 is performed, in which the wireless access point apparatus is set to a second half-bandwidth connection configuration (e.g., the upper half-bandwidth connection configuration shown in FIG. 5), and then Step S1522 is performed for the wireless communication connection with the wireless transceiver device in Channel 122. After Step S1514, Step S1524 is performed, in which the wireless access point apparatus is set to a first half-bandwidth connection configuration (e.g., the lower half-bandwidth connection configuration shown in FIG. 6), and then Step S1526 is performed for the wireless communication connection with the wireless transceiver device in Channel 106.

It should be noted that the channel switching method of the present disclosure is not limited to the content shown in FIGS. 9-15. For example, Channel 42 shown in FIGS. 12-15 can be changed to another non-DFS channel, such as Channel 155 in U-NII-3 band.

As can be seen from the above description, in the present disclosure, the wireless access point apparatus can perform seamless DFS channel switching between half-bandwidth (80 MHZ) and full-bandwidth (160 MHZ) by dynamically converting radio frequency receiving configurations as well as using the existing radio frequency circuit and cooperating with radar detectors for in-channel radar detections.

It will be apparent to those skilled in the art that various modifications and variations can be made to the structure of the present disclosure without departing from the scope or spirit of this disclosure. In view of the foregoing, it is intended that the present disclosure cover modifications and variations of this disclosure provided they fall within the scope of the following claims.

What is claimed is:
1. A wireless access point apparatus, comprising:
a mixer configured to mix a wireless signal and a carrier signal for performing frequency conversion on the wireless signal;
an analog low-pass filter (ALPF) coupled to the mixer and having a passband, the ALPF configured to perform filtering on the wireless signal, so as to filter out a signal component of the wireless signal outside the passband;
an analog-to-digital converter (ADC) coupled to the ALPF, the ADC configured to convert the filtered wireless signal from an analog form to a digital form;
at least one radar detector coupled to the ADC, the at least one radar detector configured to detect whether the filtered wireless signal in the digital form comprises any radar signal; and
a controller coupled to the at least one radar detector, the controller configured to adjust a carrier frequency of the carrier signal according to a detection result of the at least one radar detector, so as to switch between at least one dynamic frequency selection (DFS) channel, a non-DFS channel and a composite channel.

2. The wireless access point apparatus of claim 1, wherein a frequency band of the composite channel covers frequency bands of the non-DFS channel and the at least one DFS channel.

3. The wireless access point apparatus of claim 2, wherein the at least one DFS channel, the non-DFS channel and the composite channel are respectively Channel 58, Channel 42 and Channel 50 in U-NII-1 and U-NII-2A bands.

4. The wireless access point apparatus of claim 1, wherein the at least one DFS channel is a plurality of DFS channels, and a frequency band of the composite channel covers a frequency band of the at least one DFS channel but does not cover a frequency band of the non-DFS channel.

5. The wireless access point apparatus of claim 4, wherein the at least one DFS channel and the composite channel are respectively Channel 106, Channel 122 and Channel 114 in a U-NII-2C band, and the non-DFS channel is Channel 42 in a U-NII-1 band.

6. A channel switching method for a wireless access point apparatus, the channel switching method comprising:
- entering a DFS channel while the wireless access point apparatus is activated;
- detecting whether any radar signal is present in the DFS channel;
- entering a non-DFS channel and setting the wireless access point apparatus to a half-bandwidth connection configuration for performing a wireless communication connection in response to detecting that a radar signal is in the DFS channel; and
- entering a composite channel and setting the wireless access point apparatus to a full-bandwidth connection configuration for performing the wireless communication connection in response to that no radar signal is detected in the DFS channel, wherein a frequency band of the composite channel covers frequency bands of the DFS channel and the non-DFS channel.

7. The channel switching method of claim 6, further comprising:
- continuing to detect whether any radar signal is present in the DFS channel after entering the non-DFS channel;
- repeating the step of detecting whether any radar signal is present in the DFS channel after a predetermined time interval in response to detecting that the radar signal is in the DFS channel; and
- entering the composite channel and setting the wireless access point apparatus to the full-bandwidth connection configuration for performing the wireless communication connection in response to that no radar signal is detected in the DFS channel.

8. The channel switching method of claim 6, further comprising:
- continuing to detect whether any radar signal is present in the DFS channel after entering the composite channel; and
- entering the non-DFS channel and setting the wireless access point apparatus to the half-bandwidth connection configuration for performing the wireless communication connection in response to detecting that the radar signal is in the DFS channel.

9. The channel switching method of claim 6, wherein the DFS channel, the non-DFS channel and the composite channel are respectively Channel 58, Channel 42 and Channel 50 in U-NII-1 and U-NII-2A bands.

10. A channel switching method for a wireless access point apparatus, the channel switching method comprising:
- entering a first DFS channel while the wireless access point apparatus is activated;
- detecting whether any radar signal is present in the first DFS channel;
- entering a second DFS channel and detecting whether any radar signal is present in the second DFS channel in response to detecting that a first radar signal is in the first DFS channel, and setting the wireless access point apparatus to a first half-bandwidth connection configuration for performing a wireless communication connection in the first DFS channel in response to that no radar signal is detected in the first DFS channel; and
- entering a non-DFS channel and setting the wireless access point apparatus to the first half-bandwidth connection configuration for performing the wireless communication connection in response to detecting that a second radar signal is in the second DFS channel, and setting the wireless access point apparatus to a second half-bandwidth connection configuration for performing the wireless communication connection in response to that no radar signal is detected in the second DFS channel.

11. The channel switching method of claim 10, wherein the first DFS channel and the second DFS channel are respectively Channel 106 and Channel 122 in a U-NII-2C band, and the non-DFS channel is outside the U-NII-2C band.

12. The channel switching method of claim 11, wherein the non-DFS channel is Channel 42 in a U-NII-1 band.

13. The channel switching method of claim 10, further comprising:
- continuing to detect whether any radar signal is present in the first DFS channel signal and detecting whether any radar signal is present in the second DFS channel after setting the wireless access point apparatus to the first half-bandwidth connection configuration for performing the wireless communication connection in the first DFS channel;
- entering the non-DFS channel and setting the wireless access point apparatus to the first half-bandwidth connection configuration for performing the wireless communication connection in response to detecting that the first radar signal is in the first DFS channel and the second radar signal is in the second DFS channel;
- entering a composite channel and setting the wireless access point apparatus to a full-bandwidth connection configuration for performing the wireless communication connection in response to that no radar signal is detected in the first DFS channel and the second DFS channel, wherein a frequency band of the composite channel covers frequency bands of the first DFS channel and the second DFS channel but does not cover a frequency band of the non-DFS channel;
- entering the second DFS channel and setting the wireless access point apparatus to the second half-bandwidth connection configuration for performing the wireless communication connection in response to detecting that the first radar signal is in the first DFS channel but no radar signal is in the second DFS channel; and
- continuing to detect whether any radar signal is present in the first DFS channel and repeating the step of detecting whether any radar signal is present in the second DFS channel after a predetermined time interval, in response to detecting that no radar signal is in the first DFS channel but the second radar signal is in the second DFS channel.

14. The channel switching method of claim 13, further comprising:
- continuing to detect whether any radar signal is present in the first DFS channel and the second DFS channel after setting the wireless access point apparatus to the second half-bandwidth connection configuration for performing the wireless communication connection in the second DFS channel;
- entering the non-DFS channel and setting the wireless access point apparatus to the first half-bandwidth connection configuration for performing wireless communication connection in response to detecting that the first radar signal is in the first DFS channel and the second radar signal is in the second DFS channel;
- continuing to detect whether any radar signal is present in the first DFS channel and the second DFS channel in response to that no radar signal is detected in the first DFS channel and the second DFS channel;
- entering the second DFS channel and setting the wireless access point apparatus to the second half-bandwidth connection configuration for performing the wireless communication connection in response to detecting that the first radar signal is in the first DFS channel but no radar signal is in the second DFS channel; and entering the first DFS channel and setting the wireless access point apparatus to the first half-bandwidth connection configuration for performing the wireless communication connection in response to detecting that no radar signal is in the first DFS channel but the second radar signal is in the second DFS channel.

15. The channel switching method of claim 13, wherein the first DFS channel, the second DFS channel and the composite channel are respectively Channel 106, Channel 122 and Channel 114 in a U-NII-2C band, and the non-DFS channel is outside the U-NII-2C band.

16. The channel switching method of claim 15, wherein the non-DFS channel is Channel 42 in a U-NII-1 band.

17. The channel switching method of claim 10, further comprising:

detecting whether any radar signal is present in the first DFS channel and continuing to detect whether any radar signal is present in the second DFS channel after setting the wireless access point apparatus to the second half-bandwidth connection configuration for performing the wireless communication connection in the second DFS channel;

entering the non-DFS channel and setting the wireless access point apparatus to the first half-bandwidth connection configuration for performing the wireless communication connection in response to detecting that the first radar signal is in the first DFS channel and the second radar signal is in the second DFS channel;

entering a composite channel and setting the wireless access point apparatus to a full-bandwidth connection configuration for performing the wireless communication connection in response to that no radar signal is detected in the first DFS channel and the second DFS channel, wherein a frequency band of the composite channel covers frequency bands of the first DFS channel and the second DFS channel but does not cover a frequency band of the non-DFS channel;

repeating the step of detecting whether any radar signal is present in the first DFS channel after a predetermined time interval and continuing to detect whether any radar signal is present in the second DFS channel, in response to detecting that the first radar signal is in the first DFS channel but no radar signal is in the second DFS channel; and entering the first DFS channel and setting the wireless access point apparatus to the first half-bandwidth connection configuration for performing the wireless communication connection in response to detecting that no radar signal is in the first DFS channel but the second radar signal is in the second DFS channel.

18. The channel switching method of claim 17, further comprising:

continuing to detect whether any radar signal is present in the first DFS channel and the second DFS channel after setting the wireless access point apparatus to the full-bandwidth connection configuration for performing the wireless communication connection via the composite channel;

entering the non-DFS channel and setting the wireless access point apparatus to the first half-bandwidth connection configuration for performing the wireless communication connection in response to detecting that the first radar signal is in the first DFS channel and the second radar signal is in the second DFS channel;

continuing to detect whether any radar signal is present in the first DFS channel and the second DFS channel in response to that no radar signal is detected in the first DFS channel and the second DFS channel;

entering the second DFS channel and setting the wireless access point apparatus to the second half-bandwidth connection configuration for performing the wireless communication connection in response to detecting that a first radar signal is in the first DFS channel but no radar signal is in the second DFS channel; and entering the first DFS channel and setting the wireless access point apparatus to the first half-bandwidth connection configuration for performing the wireless communication connection in response to detecting that no radar signal is in the first DFS channel but the second radar signal is in the second DFS channel.

19. The channel switching method of claim 17, wherein the first DFS channel, the second DFS channel and the composite channel are respectively Channel 106, Channel 122 and Channel 114 in a U-NII-2C band, and the non-DFS channel is outside the U-NII-2C band.

20. The channel switching method of claim 19, wherein the non-DFS channel is Channel 42 in a U-NII-1 band.

* * * * *